United States Patent
Zhang et al.

(10) Patent No.: US 8,774,160 B2
(45) Date of Patent: Jul. 8, 2014

(54) METHOD AND SYSTEM FOR SCHEDULING FREQUENCY PHYSICAL RESOURCES BASED ON FREQUENCY HOPPING

(75) Inventors: Changsheng Zhang, Shenzhen (CN); Zhuo Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 327 days.

(21) Appl. No.: 13/258,101

(22) PCT Filed: Jul. 22, 2010

(86) PCT No.: PCT/CN2010/075404
§ 371 (c)(1),
(2), (4) Date: Apr. 16, 2012

(87) PCT Pub. No.: WO2011/044787
PCT Pub. Date: Apr. 21, 2011

(65) Prior Publication Data
US 2012/0250653 A1  Oct. 4, 2012

(30) Foreign Application Priority Data
Oct. 16, 2009 (CN) .......................... 2009 1 0178320

(51) Int. Cl.
*H04B 7/212* (2006.01)
(52) U.S. Cl.
USPC ........................................................ 370/347
(58) Field of Classification Search
CPC .... H04W 72/04; H04W 28/26; H04B 7/2615; H04B 1/713; H04B 2001/6908
USPC .......... 370/336, 310, 203, 210, 330, 345, 347
See application file for complete search history.

(56) References Cited

U.S. PATENT DOCUMENTS

| 2005/0085236 A1 | 4/2005 | Gerlach et al. |
| 2007/0159993 A1 | 7/2007 | Classon et al. |

(Continued)

FOREIGN PATENT DOCUMENTS

| CN | 1610333 A | 4/2005 |
| CN | 101155393 A | 4/2008 |

(Continued)

OTHER PUBLICATIONS

Signaling of Frequency Hopping for UL Transmission Aug. 24, 2007.

(Continued)

*Primary Examiner* — Raj Jain
(74) *Attorney, Agent, or Firm* — Oppedahl Patent Law Firm LLC

(57) ABSTRACT

The disclosure discloses a method and a system for scheduling frequency physical resources based on frequency hopping. The method comprises: in two time slots of frequency hopping transmission, reserving frequency physical resources for an activated semi-persistent scheduling new transmission user with a transmission period reached and a retransmission user; obtaining a scheduling type of a user required for scheduling, and according to an occupancy situation of the frequency physical resources, obtaining corresponding available frequency physical resources when employing a frequency-selective scheduling type and a non-frequency-selective scheduling type; and according to the scheduling type of the user required for scheduling, searching for corresponding available frequency physical resources, and allocating the frequency physical resources to a frequency-selective scheduling user and a non-frequency-selective scheduling user simultaneously during one scheduling period.

20 Claims, 9 Drawing Sheets

(56) References Cited

U.S. PATENT DOCUMENTS

| | | | |
|---|---|---|---|
| 2007/0237068 A1* | 10/2007 | Bi et al. | 370/208 |
| 2008/0187027 A1* | 8/2008 | Malladi | 375/135 |
| 2008/0205552 A1 | 8/2008 | Sartori et al. | |
| 2008/0232240 A1* | 9/2008 | Baum et al. | 370/210 |
| 2008/0279125 A1* | 11/2008 | Hottinen | 370/281 |
| 2010/0098012 A1* | 4/2010 | Bala et al. | 370/329 |
| 2011/0228731 A1* | 9/2011 | Luo et al. | 370/329 |
| 2013/0034070 A1* | 2/2013 | Seo et al. | 370/329 |
| 2013/0201964 A1* | 8/2013 | Kim et al. | 370/335 |

FOREIGN PATENT DOCUMENTS

| | | |
|---|---|---|
| JP | 2008053865 A | 3/2008 |
| JP | 2009049539 A | 3/2009 |
| JP | 2009049541 A | 3/2009 |

OTHER PUBLICATIONS

International Search Report on international application No. PCT/CN2010/075404, mailed on Nov. 4, 2010.

English Translation of the Written Opinion of the International Search Authority in international application No. PCT/CN2010/075404, mailed on Nov. 4, 2010.

* cited by examiner

METHOD AND SYSTEM FOR SCHEDULING FREQUENCY PHYSICAL RESOURCES BASED ON FREQUENCY HOPPING

TECHNICAL FIELD

The disclosure relates to the field of broadband mobile communications and a frequency hopping transmission technology, particularly to a method and system for scheduling frequency physical resources based on frequency hopping.

BACKGROUND

Nowadays, broadband mobile communications are the development trend of mobile communications, wherein a Long Term Evolution (LTE) system is an evolutionary mobile communication system driven by the 3rd Generation Partnership Project (3GPP) Standards Origination, wherein an Orthogonal Frequency Division Multiplexing Access (OFDMA) technology is employed for the downlink and a Single Carrier-FDMA (SC-FDMA) radio access technology is employed for the uplink, so as to improve the throughput and the spectrum utilization efficiency of the LTE system, further to improve the data transmission rate.

For the SC-FDMA technology employed for the uplink of the LTE system, the allocation of frequency physical resources must be continuous in order to obtain a low signal Peak to Average Power Rate (PAPR). In order to obtain frequency diversity gain from the uplink similar to the distributed frequency physical resources allocation in the downlink, a frequency hopping transmission technology is employed for the uplink of the LTE system.

As a spread spectrum technology that realizes spectrum broadening by using carrier jump, the frequency hopping is widely applied in an anti-interference communication system. The method is to divide a broad frequency band into several frequency intervals (frequency channels), and control a carrier frequency of a signal transmitted by a transmitting terminal at a certain specific residence time.

Combination of the frequency hopping transmission technology and non-frequency-selective scheduling can obtain the frequency diversity gain, while the frequency-selective scheduling can optimize resource allocation by allocating optimal frequency physical resources to users, thereby obtaining the maximum gain. The frequency physical resource allocation way employed by the frequency-selective scheduling is as follows: according to the fading situation of all frequency bands, a frequency band with the minimum fading is selected for the user, so as to allocate the optimal frequency physical resources to the user; the frequency physical resource allocation way employed by the non-frequency-selective scheduling is as follows: in the case of not adopting the principle of selecting the frequency band with the minimum fading, some idle frequency bands are selected to allocate the frequency physical resources to the user.

When a scheduling period is reached, according to the occupancy situation of the frequency physical resources, a base station performs frequency physical resource scheduling for the users which are required to perform the resource scheduling. As the non-frequency-selective scheduling and the frequency-selective scheduling based on frequency hopping differ in the frequency physical resource allocation way, generally, it is difficult to apply them in one scheduling period simultaneously, which is against to improve performances of the system, such as the throughput and so on.

SUMMARY

The disclosure provides a method and system for scheduling frequency physical resources based on frequency hopping, to solve the problem that it is difficult to apply frequency-selective scheduling and non-frequency-selective scheduling simultaneously to perform the allocation of the frequency physical resources in the prior art, which is against to improve performances of the systems, such as the throughput and so on.

The disclosure provides a method for scheduling frequency physical resources based on frequency hopping, which comprises the following steps:

in two time slots of frequency hopping transmission, reserving frequency physical resources for an activated semi-persistent scheduling new transmission user with a transmission period reached and a retransmission user;

obtaining a scheduling type of a user required for scheduling, and according to an occupancy situation of the frequency physical resources, obtaining corresponding available frequency physical resources when employing a frequency-selective scheduling type and a non-frequency-selective scheduling type; and according to the scheduling type of the user required for scheduling, searching for corresponding available frequency physical resources, and allocating the frequency physical resources to a frequency-selective scheduling user and a non-frequency-selective scheduling user simultaneously during one scheduling period.

The disclosure further provides a system for scheduling frequency physical resources based on frequency hopping, which comprises:

a resource reserving unit is configured to, in two time slots of frequency hopping transmission, reserve frequency physical resources for an activated semi-persistent scheduling new transmission user with a transmission period reached and a retransmission user;

a scheduling type obtaining unit is configured to obtain a scheduling type of a user required for scheduling;

an available resource obtaining unit is configured to, according to an occupancy situation of the frequency physical resources, obtain corresponding available frequency physical resources when employing a frequency-selective scheduling type and a non-frequency-selective scheduling type; and a scheduling unit is configured to, according to the scheduling type of the user required for scheduling, search for corresponding available frequency physical resources, and allocate the frequency physical resources to a frequency-selective scheduling user and a non-frequency-selective scheduling user simultaneously during one scheduling period.

The beneficial effects of the disclosure are as follows: in one scheduling period, the advantages of frequency-selective scheduling and frequency-hopping-transmission-based non-frequency-selective scheduling are comprehensively utilized, so that the users with good channel quality can utilize the frequency-selective scheduling to obtain the optimal frequency resources, the users without channel quality information can obtain frequency diversity gain through frequency hopping, in this way, the system capacity can be improved without increasing equipment costs; the frequency physical resource hollow due to frequency hopping resource allocation is avoided, and the frequency resource collision for the frequency hopping users and non-frequency hopping users is also avoided.

DETAILED DESCRIPTION

A method and system for scheduling frequency physical resources based on frequency hopping provided by the disclosure will be described below in details with reference to the drawings and embodiments.

The frequency-selective scheduling and the non-frequency-selective scheduling are not combined together in one scheduling period in the existing ways for scheduling frequency physical resources. The method for scheduling frequency physical resources based on frequency hopping provided by the disclosure comprises the following steps: in two time slots of the frequency hopping transmission, reserving frequency physical resources for an activated semi-persistent scheduling new transmission user with a transmission period reached and a retransmission user, the ways for reserving frequency physical resources may be an existing way according to the scheduling type of the user; obtaining the scheduling type of the user required for scheduling, and according to the occupancy situation of the frequency physical resources, obtaining the corresponding available frequency physical resources when employing a frequency-selective scheduling type and a non-frequency-selective scheduling type; according to the scheduling type of the user required for scheduling, searching for the corresponding available frequency physical resources, and in one scheduling period, allocating the frequency physical resources to the frequency-selective scheduling users and non-frequency-selective scheduling users simultaneously. Instead of dividing the whole frequency physical resources into two parts like the prior art: one part is arranged for frequency-selective scheduling and the other part is for frequency hopping transmission, the disclosure searches the frequency physical resources available for the scheduling type on the whole frequency physical resource band according to the occupancy situation of the frequency physical resources. Compared with the prior art, the way of combination of the frequency-selective scheduling and the non-frequency-selective scheduling has the advantages that, as the service frequency band is not divided fixedly, the allocation of frequency physical resources is more flexible and the gain is more obvious.

Figure 1:
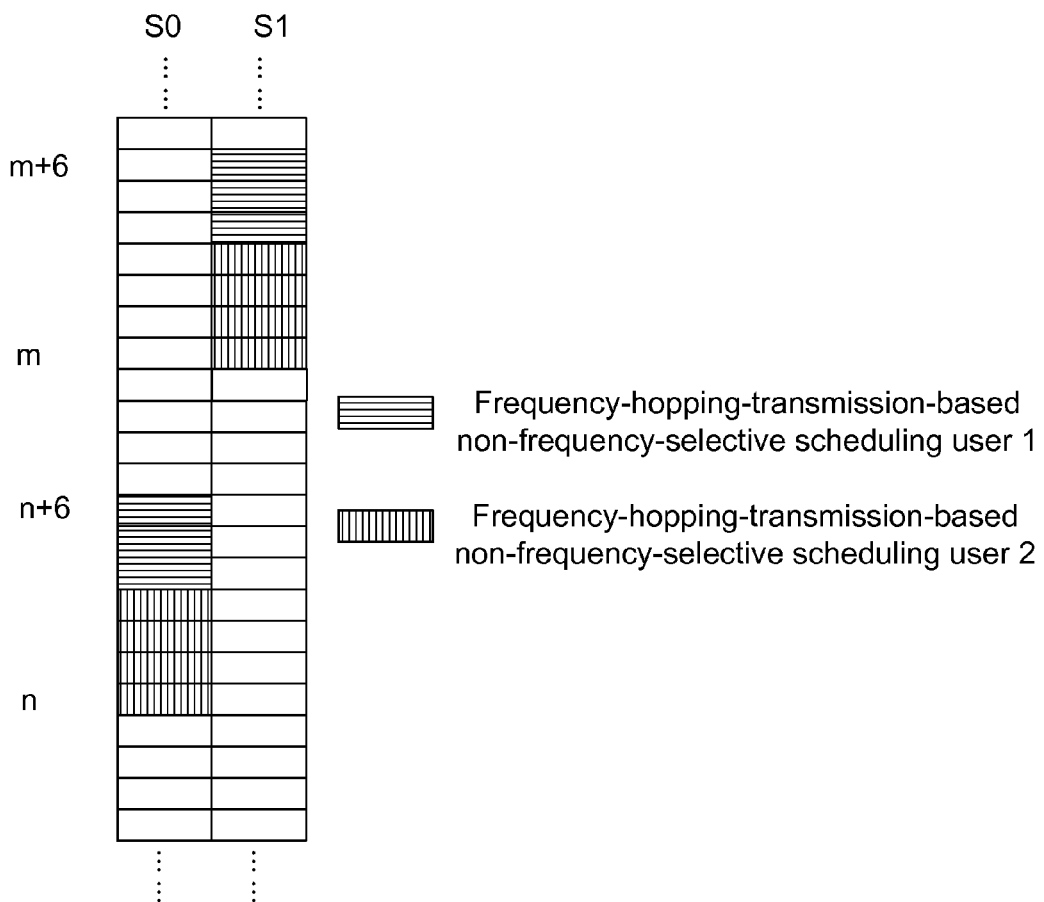
FIG. 1 shows a schematic diagram of the existing way of allocating frequency physical resources with a frequency physical resource hollow when intra-subframe frequency hopping transmission is employed.
Figure 2:
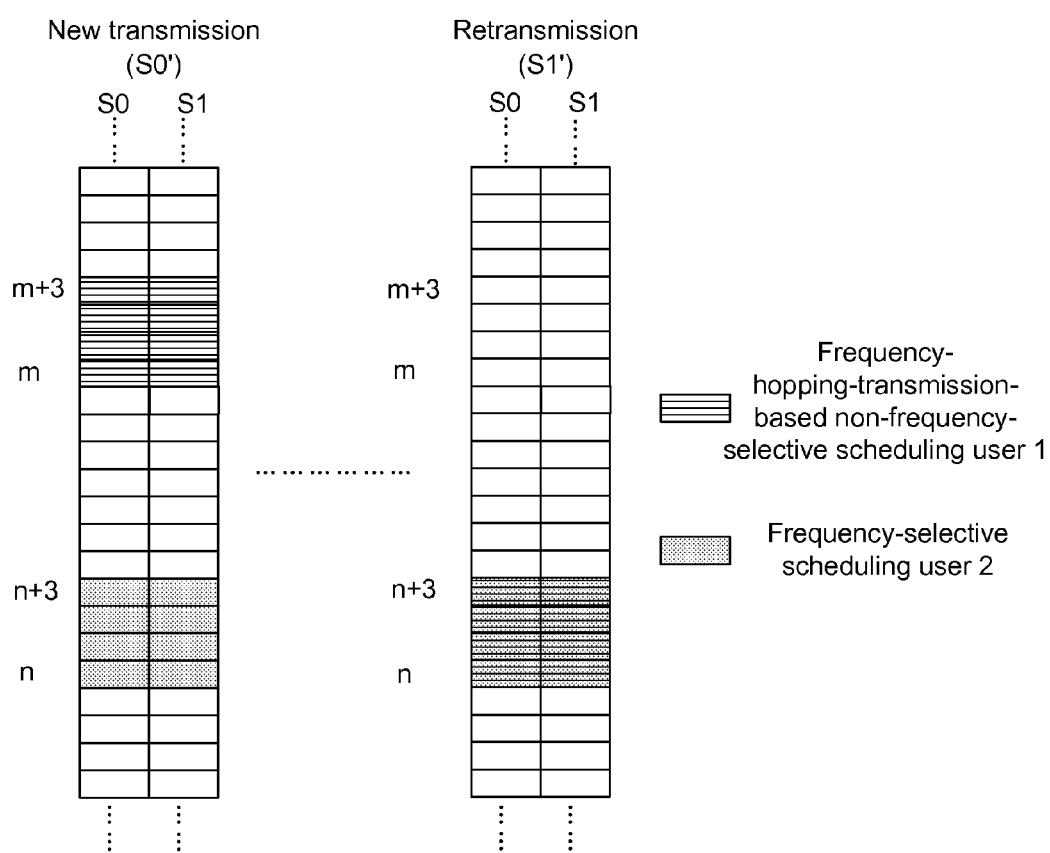
FIG. 2 shows a schematic diagram of the existing way of allocating frequency physical resources with a frequency physical resource collision when inter-subframe frequency hopping transmission is employed.

In the prior art, due to the improper way of allocating frequency physical resources, a frequency physical resource hollow is caused, that is to say, it is unable to allocate the frequency physical resources for non-frequency-hopping transmission users and frequency-selective scheduling users, so as to waste the frequency resources. Frequency hopping transmission including intra-subframe frequency hopping and inter-subframe frequency hopping is employed for uplink of an LTE system. When the intra-subframe frequency hopping is employed, the two time slots for the frequency hopping are one subframe employing the intra-subframe frequency hopping. FIG. 1 shows a frequency physical resource hollow caused by an improper allocation of the frequency resources when the intra-subframe frequency hopping is employed in the prior art, such that the frequency physical resource blocks m~m+6 of the first time slot S0 and the frequency physical resource blocks n~n+6 of the second time slot perform hollows, so as to be unable to be allocated for the non-frequency-hopping transmission users and frequency-selective scheduling users. When the inter-subframe frequency hopping is employed, the two time slots for frequency hopping according to the disclosure are a new transmission subframe or retransmission subframe employing inter-subframe frequency hopping. For one subframe, the frequency physical resources occupied by the two time slots S0 and S1 for the transmission of the subframe are identical, for a non-frequency-selective scheduling user of frequency hopping transmission, the frequency physical resources occupied by the two time slots S0' and S1' (time slots in the frequency hopping) are different. Take the retransmission as an example, as shown in FIG. 2, the existing way of allocating frequency physical resources is employed, the frequency physical resource blocks n~n+3 of the time slot occupied by the new transmission subframe in the frequency hopping may be allocated to non-frequency-hopping transmission frequency-selective scheduling user 2, then when the retransmission is performed as an error occurs, a frequency physical resource collision will occur, in the second time slot of the frequency hopping, between frequency-hopping-transmission-based non-frequency-selective user 1 and non-frequency-hopping transmission frequency-selective scheduling user 2 during the retransmission.

In order to solve the problems of the frequency physical resource hollow and frequency physical resource collision, in the disclosure, when the scheduling type of a user required for scheduling is non-frequency-selective scheduling, the way of allocating the frequency physical resources to the user is as follows: in two time slots of frequency hopping transmission, when the first frequency physical resources, with the first time slot not occupied while the second time slot occupied, are found, allocating the first frequency physical resources with the first time slot not occupied to the non-frequency-selective scheduling user; when the first frequency physical resources are not found and a band of second frequency physical resources with two continuous time slots not occupied is found, allocating this band of second frequency physical resources to the non-frequency-selective scheduling user.

Figure 4:
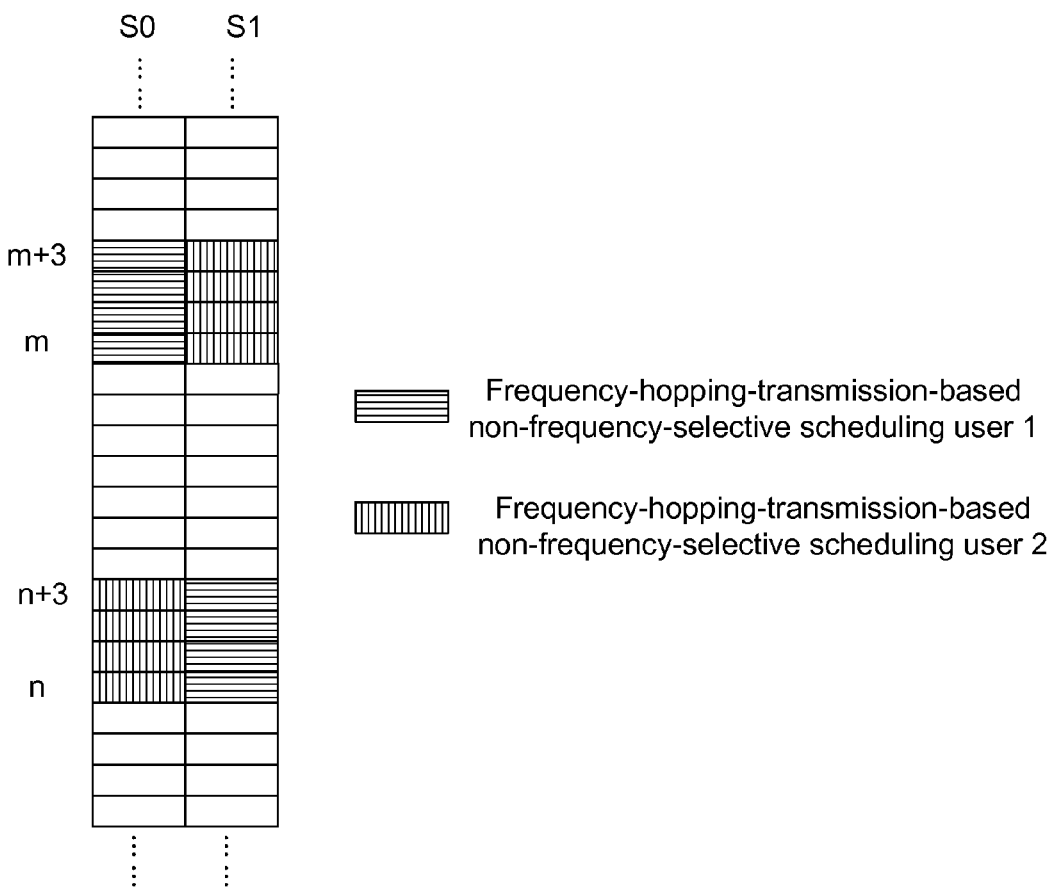
FIG. 4 shows a schematic diagram of a way of allocating frequency physical resources when intra-subframe frequency hopping transmission is employed according to an embodiment of the disclosure.
Figure 5:
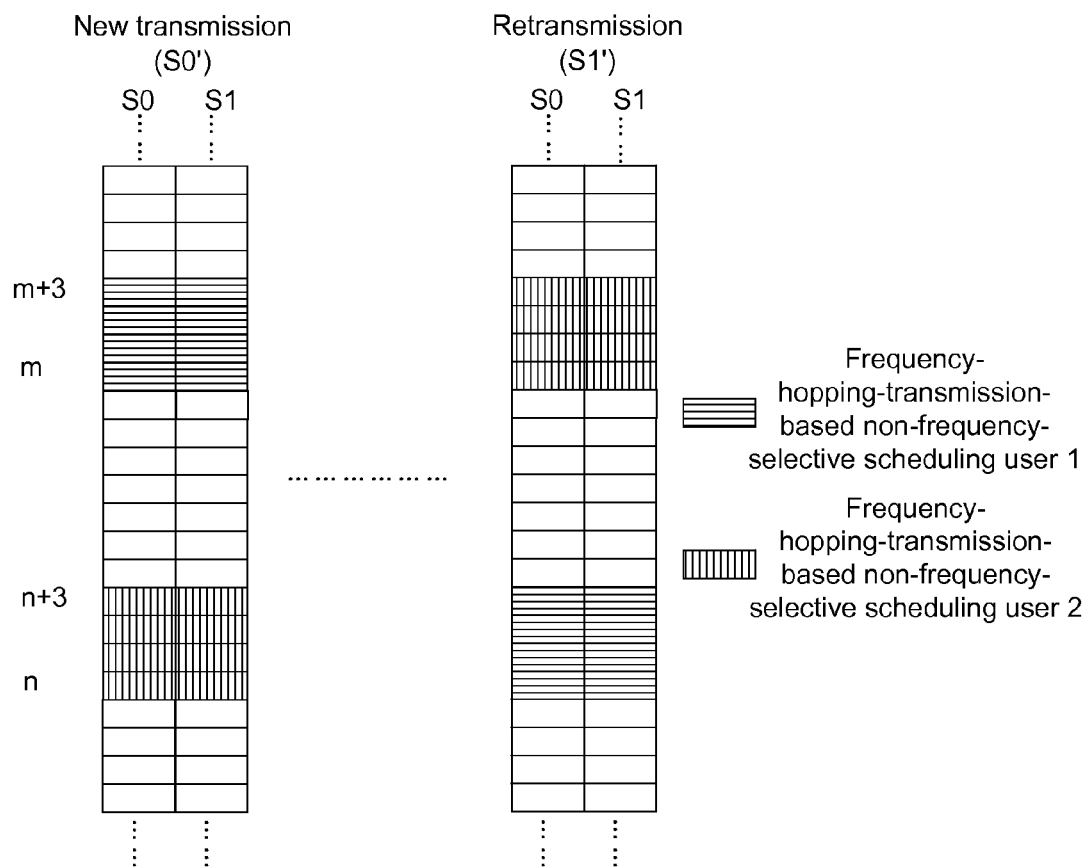
FIG. 5 shows a schematic diagram of the way of allocating frequency physical resources when inter-subframe frequency hopping transmission is employed according to an embodiment of the disclosure.

This allocation way can avoid not only the frequency physical resource hollow resulted from allocation of the frequency hopping resources, but also the resource collision of frequency hopping users and non-frequency-hopping users. Furthermore, this way allocates complementary frequency physical resources to the non-frequency-selective scheduling users employing the frequency hopping transmission, such that the position of the complementary frequency physical resource blocks will not change during the period when they are occupied by the users. FIG. 4 shows a way of allocating complementary resources for intra-subframe frequency hopping transmission, two frequency hopping users 1 and 2 occupy the frequency physical resources n~n+3 and m~m+3 in common, and the frequency physical resources occupied by the two users will not jump beyond such two ranges; FIG. 5 shows a way of allocating complementary resources for inter-subframe frequency hopping transmission, the two users will occupy the frequency physical resources n~n+3 and m~m+3 during new transmission and retransmission without jumping beyond such ranges. When the scheduling type of a user required for scheduling is frequency-selective scheduling, the way of allocating frequency physical resources for the user is as follows: searching for a band of second frequency physical resources with two continuous time slots not occupied, and allocating this band of second frequency physical resources to the frequency-selective scheduling user.

Figure 3:
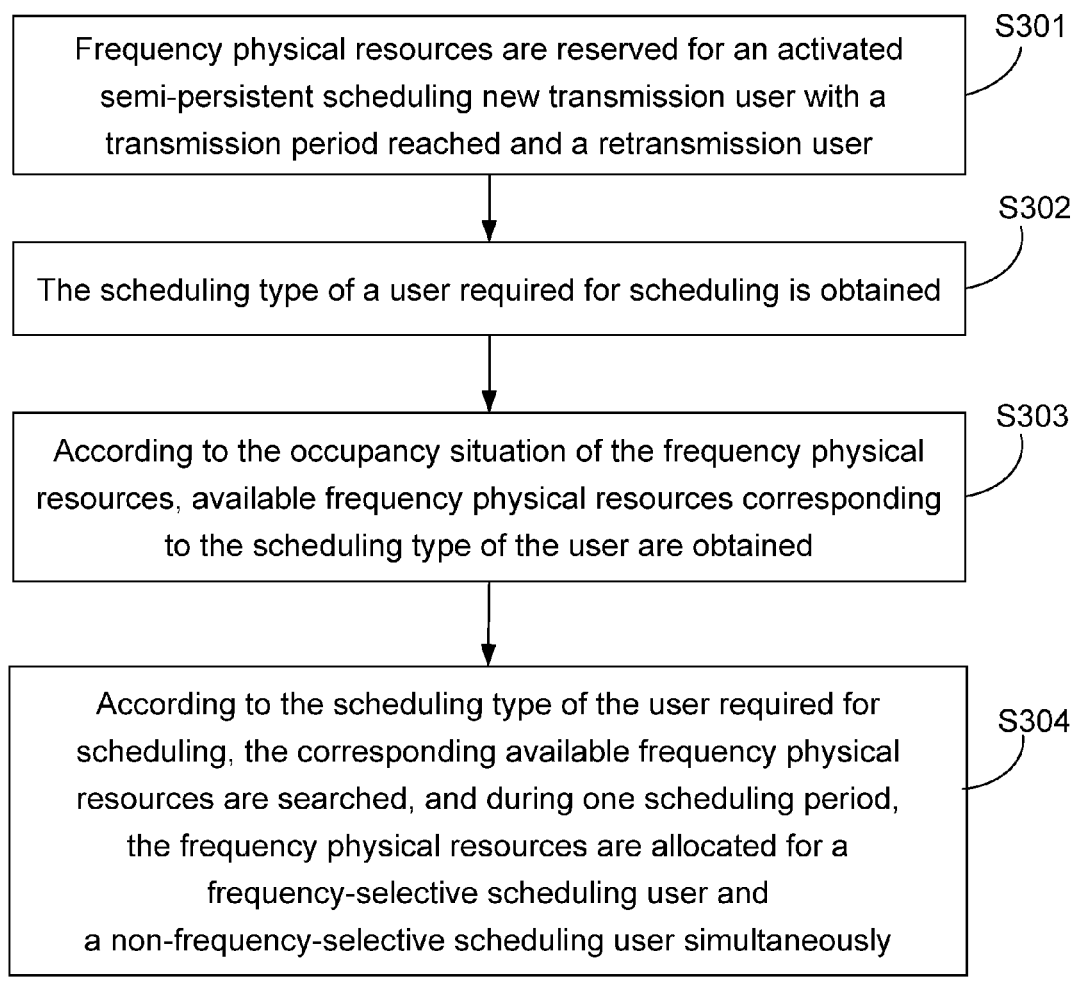
FIG. 3 shows a flow chart of a method for scheduling frequency physical resources based on frequency hopping according to embodiment 1 of the disclosure.

According to embodiment 1 of the disclosure, for a base station performing the resource scheduling, a scheduling period is set, the base station performs frequency physical resource scheduling for users required for scheduling at an interval of a certain scheduling period. When the scheduling period of the base station is reached, there may be multiple users required for scheduling, the disclosure is proposed to solve the issue of combining the frequency-selective scheduling and the frequency-hopping-transmission-based non-frequency-selective scheduling together in one scheduling period, as shown in FIG. 3, when there are multiple users required for scheduling, the frequency physical resource scheduling in the disclosure comprises the following steps.

Step S301: frequency physical resources are reserved for both an activated semi-persistent scheduling new transmission user with a transmission period reached and a retransmission user, thereby obtaining the initial occupancy situation of the frequency physical resources, otherwise no scheduling is required to be performed for an activated semi-persistent scheduling user with the transmission period thereof not reached; for the activated semi-persistent scheduling new transmission user with the transmission period reached, the frequency physical resources, which are allocated for the user when they are activated, are reserved; for the retransmission user, the frequency physical resources are reserved for them according to the retransmission ways corresponding to the different frequency hopping ways employed by them, or frequency physical resources are reserved for them according to an existing retransmission mechanism.

Step S302: the scheduling type of the user required for scheduling is obtained.

Step S303: according to the occupancy situation of the frequency physical resources, available frequency physical resources corresponding to the scheduling type of the user are obtained, that is, the corresponding available frequency physical resources are obtained when employing frequency-selective scheduling and non-frequency-selective scheduling.

In this embodiment, when the scheduling type of a user required for scheduling is non-frequency-selective scheduling, the corresponding available frequency physical resources are the first frequency physical resources, with the first time slot not occupied while the second time slot occupied, and the second frequency physical resources with two time slots not occupied both; when the scheduling type of a user required for scheduling is frequency-selective scheduling, the corresponding available frequency physical resources are the second frequency physical resources with two time slots not occupied both.

The method for obtaining the scheduling type of a user required for scheduling is as follows: if uplink channel quality information of a user is obtained, the scheduling type of the user is frequency-selective scheduling; if uplink channel quality information of a user is not obtained, the scheduling type of the user is non-frequency-selective scheduling based on the frequency hopping transmission; if the user is a semi-persistent scheduling user waiting for an activation, the scheduling type of the user is non-frequency-selective scheduling based on the frequency hopping transmission.

The semi-persistent scheduling user means a user allocated, by the base station, with a transmission period, and a position and a size of frequency physical resources to be occupied during transmission. When the transmission period is reached, the semi-persistent scheduling user will occupy the frequency physical resources allocated by the base station to complete the transmission. Therefore, the transmission period, and the position and size of frequency physical resources to be occupied during transmission are allocated for the semi-persistent scheduling user by the base station; before the reallocation has been done by the base station, the user will occupy fixed frequency physical resources when the transmission period reaches. The activated semi-persistent scheduling user mean a user already allocated with the transmission period and the frequency physical resources. The semi-persistent scheduling user waiting for the activation means a user waiting for being allocated with the transmission period and the frequency physical resources by the base station.

Step S304: according to the scheduling type of the user required for scheduling, the corresponding available frequency physical resources are searched, and in one scheduling period, the frequency physical resources are allocated for the frequency-selective scheduling users and non-frequency-selective scheduling users simultaneously.

If the scheduling type of a user took out is non-frequency-selective scheduling, firstly, it is to search whether there are first frequency physical resources, with the first time slot not occupied while the second time slot occupied; when the first frequency physical resources exist, the first frequency physical resources with the first time slot not occupied are allocated to the frequency-hopping-transmission-based non-frequency-selective scheduling user. For the intra-subframe frequency hopping transmission, as shown in FIG. 4, if the frequency physical resource blocks n~n+3 of the first time slot S0 and the frequency physical resource blocks m~m+3 of the second time slot S1 have been reserved for frequency-hopping-transmission-based non-frequency-selective scheduling user 2, the frequency physical resource blocks m~m+3 are the first frequency physical resources meeting the requirements, and the frequency physical resource blocks m~m+3 of the first time slot S0 are allocated for frequency-hopping-transmission-based non-frequency-selective user 1. For a base station, the frequency offset during frequency hopping is fixed, therefore, it only needs to allocate the frequency physical resources of the first time slot to the frequency-hoppingtransmission-based non-frequency-selective user, and based on the fixed offset during the frequency hopping, the user terminal will occupy the frequency physical resource blocks n~n+3 of the second time slot S1 after occurring the fixed offset at the second time slot. In this way, a complementary frequency physical resource allocation way is formed as shown in FIG. 4. For the inter-subframe frequency hopping transmission, as shown in FIG. 5, the time slot occupied by a new transmission subframe is the first time slot S0', the time slot occupied by a retransmission subframe is the second time slot S1', a complementary frequency physical resource allocation way can also be formed according to above method, which will not be described herein again.

When the first frequency physical resources are not found, a band of second frequency physical resources with two continuous time slots not occupied is searched, the band of the second frequency physical resources with the first time slot not occupied allocated to a non-frequency-selective scheduling user. That is to say, when a allocation way of complementary frequency physical resources is not found, the frequency physical resources with two continuous idle time slots will be occupied. When the scheduling type of a user required for scheduling is frequency-selective scheduling, the way of allocating frequency physical resources for the user is as follows: searching a band of second frequency physical resources with two continuous time slots not occupied, then allocating this band of second frequency physical resources to the frequency-selective scheduling user. For a frequency-selective scheduling user, as an optimal allocation principle of frequency physical resources has to be met, the frequency physical resources occupied in the two time slots of the frequency hopping transmission are identical.

During one scheduling period, the method provided by the disclosure sufficiently utilizes the uplink channel quality information of a mobile user obtained by a base station, utilizes the frequency-selective scheduling to allocate optimal frequency physical resources to the user, authorizes a mobile user without uplink channel quality information or a semi-persistent scheduling user to employ the frequency hopping transmission way to obtain frequency diversity gain, comprehensively utilizes the advantages of the frequency-selective scheduling and the non-frequency-selective scheduling based on the frequency hopping transmission, thereby improving performances of the systems, such as throughput and so on.

According to embodiment 2 of the disclosure, for a base station, a cell is configured to be intra-subframe frequency hopping transmission, therefore the two time slots of frequency hopping transmission are one subframe employing the intra-subframe frequency hopping. The method for scheduling frequency physical resources in the embodiment will be described below in the case of employing intra-subframe frequency hopping transmission.

Figure 6:
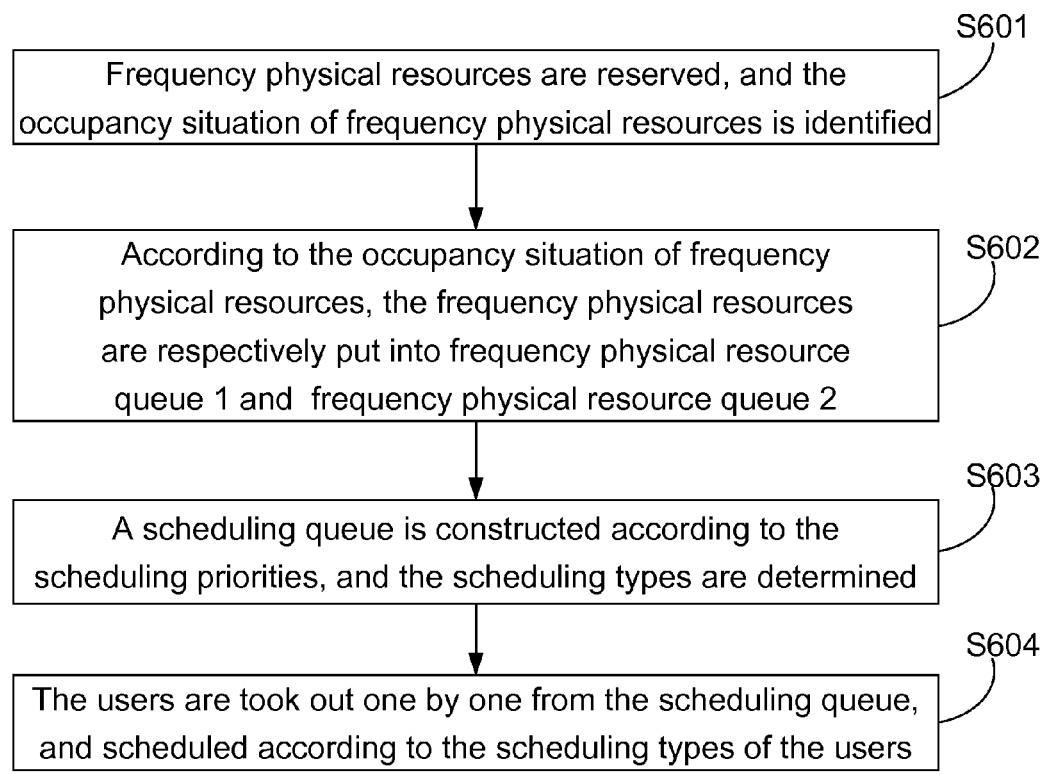
FIG. 6 shows a flow chart of a method for scheduling frequency physical resources based on intra-subframe frequency hopping transmission according to embodiment 2 of the disclosure.

As shown in FIG. 6, the method for scheduling frequency physical resources based on frequency hopping in this embodiment comprises the following steps.

Step S601: frequency physical resources are reserved for both an activated semi-persistent scheduling new transmission user with a transmission period reached and a retransmission user, for simplicity, the occupancy and idleness of the frequency physical resources are presented by a resource list in this embodiment; therefore this step is to identify the frequency physical resource occupancy situation of the activated semi-persistent scheduling new transmission user with the transmission period reached and the retransmission user in the list which presents the frequency physical resource occupancy situation.

Figure 7:
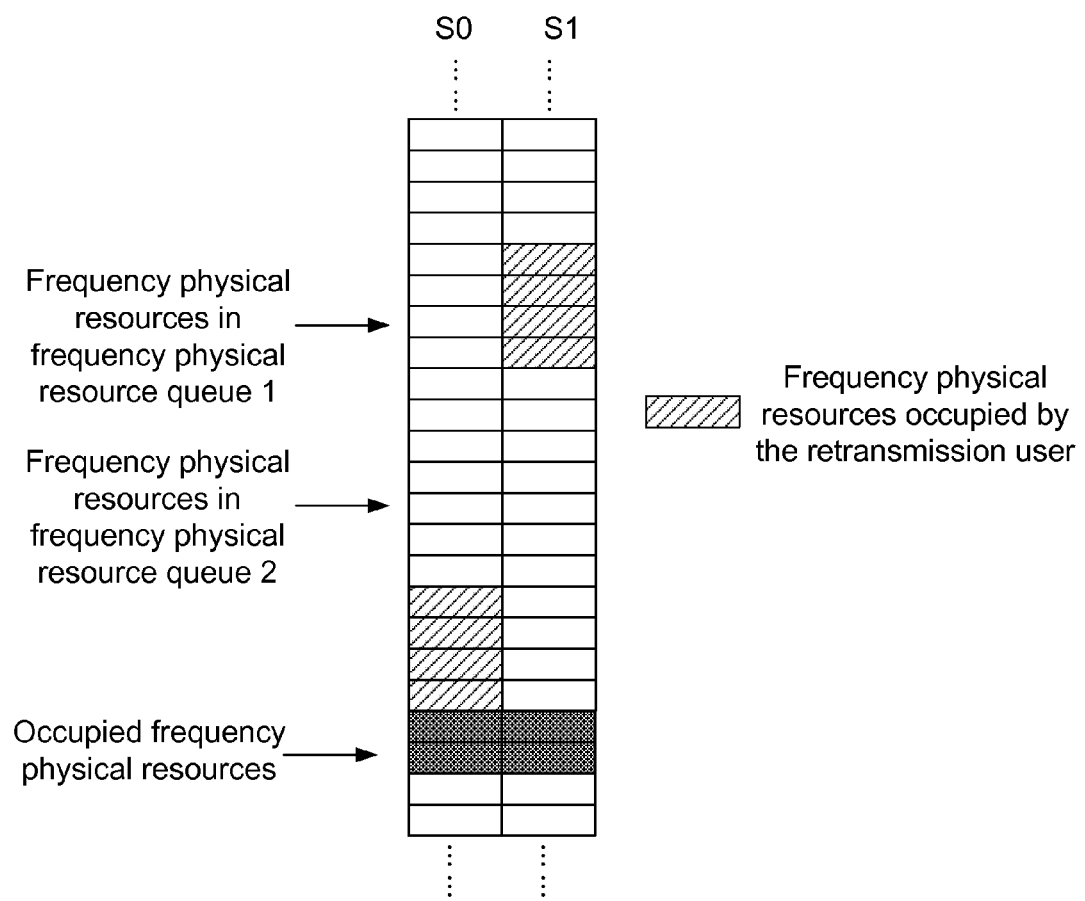
FIG. 7 shows a schematic diagram of a frequency resource list based on intra-subframe frequency hopping transmission according to embodiment 2 of the disclosure.

For the activated semi-persistent scheduling new transmission user with the transmission period reached, the way of reserving the frequency physical resources for the user is as follows: reserving the frequency physical resources, which are allocated for the user, when they are activated; for the retransmission user, the way of reserving frequency physical resources for the user is as follows: reserving the frequency physical resources, which are identical to those occupied by the new transmission subframe of the retransmission user; for a frequency-selective scheduling new transmission user, the way of reserving frequency physical resources for the user is as follows: reserving, in two time slots, the frequency physical resources which are identical to those occupied by the new transmission. For a frequency-hopping-transmission-based non-frequency-selective scheduling new transmission user, the frequency physical resources reserved for the user in two time slots are also identical to those occupied by the new transmission subframe of the retransmission user. As shown in FIG. 7, if the new transmission subframe occupies frequency physical resource blocks n~n+3 and m~m+3 in two time slots respectively, the retransmission subframe will still occupy the frequency physical resource blocks n~n+3 and m~m+3 in two time slots respectively.

Step S602: according to the occupancy situation of the frequency physical resources, the frequency physical resources are put into two queues respectively: frequency physical resource queue 1 and frequency physical resource queue 2:

1) frequency physical resource queue 1 contains such frequency physical resources: for a certain subframe, the first time slot of the frequency physical resources has not been allocated for a user, while the second time slot of the frequency physical resources has been allocated for a user, as shown in FIG. 7;

2) frequency physical resource queue 2 contains such frequency physical resources: for a certain subframe, the two time slots of the frequency physical resources have not been allocated for a user, as shown in FIG. 7.

Step S603: the scheduling queue is constructed according to the scheduling priorities of the users required for scheduling, and the scheduling types of the users in the scheduling queue are determined as:

1) when uplink channel quality information of a user is obtained by a base station through an uplink reference signal, then the user is marked as a frequency-selective scheduling user;

2) when uplink channel quality information of a user is not obtained by a base station, then the user is marked as a frequency-hopping-transmission-based non-frequency-selective scheduling user;

3) when the user is a semi-persistent scheduling user waiting for an activation (for example, a VoIP user), the user is marked as a frequency-hopping-transmission-based non-frequency-selective scheduling user.

The scheduling priorities of users can be calculated by various existing scheduling algorithms, such as Round Robin, Largest Throughput and Proportional Fairness, or can be configured as needed.

Figure 8:
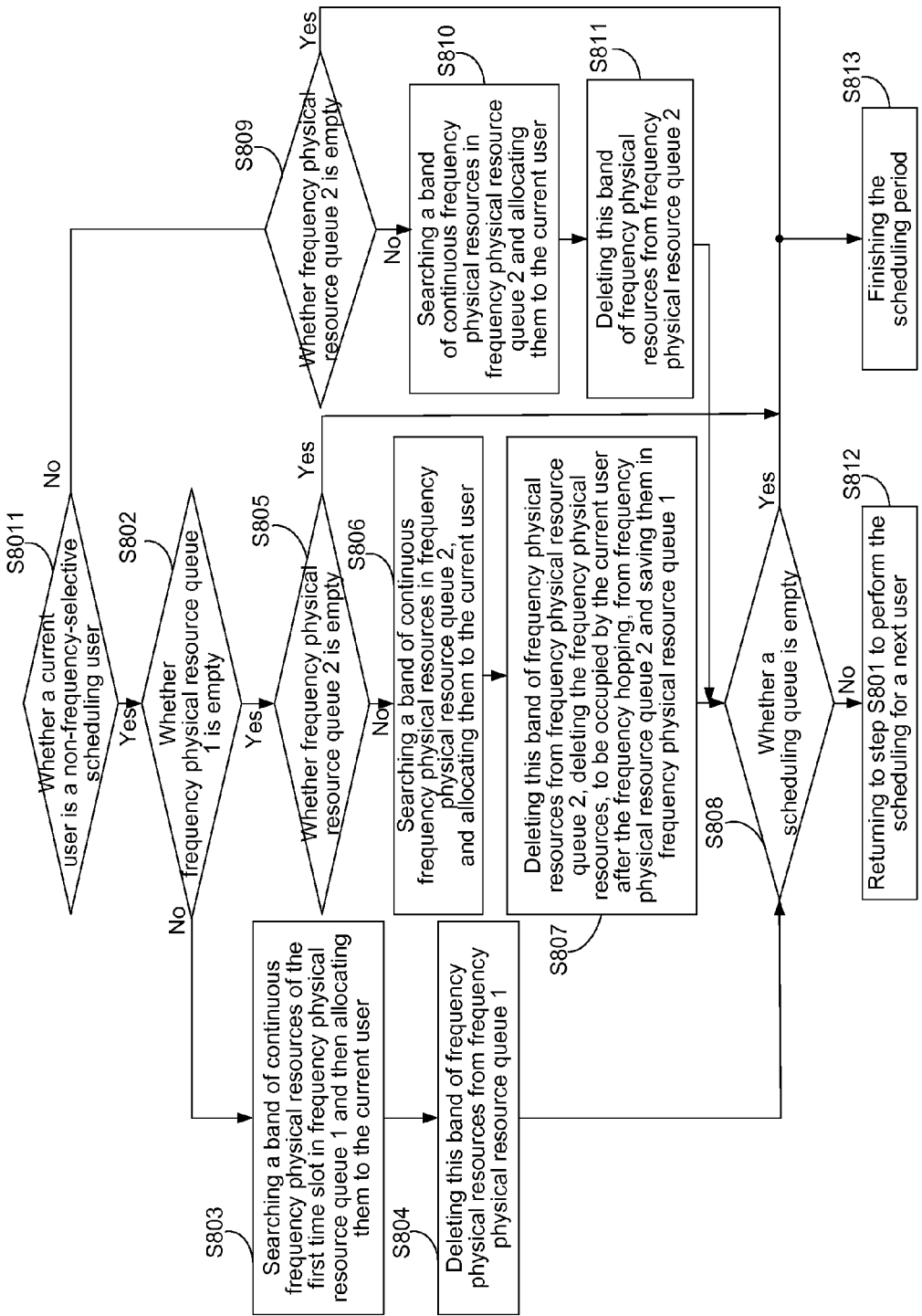
FIG. 8 shows a specific flow chart of scheduling frequency physical resources based on intra-subframe frequency hopping transmission according to embodiment 2 of the disclosure.

Step S604: the users are took out one by one from the scheduling queue, and scheduled according to the scheduling types of the users; as shown in FIG. 8, it specifically comprises the following steps:

step S801: determining whether a current user is a non-frequency-selective scheduling user, if yes, turning to step S802; otherwise, turning to step S809;

step S802: determining whether current frequency physical resource queue 1 is empty, if yes, turning to step S805; otherwise, turning to step S803;

step S803: searching a band of continuous frequency physical resources in frequency physical resource queue 1, and allocating the band of continuous frequency physical resources, with the first time slot idle, to the current non-frequency-selective scheduling user;

step S804: deleting this band of frequency physical resources allocated in step S803 from frequency physical resource queue 1, and turning to step S808;

step S805: determining whether frequency physical resource queue 2 is empty, if yes, turning to step S813; otherwise, turning to step S806;

step S806: searching a band of continuous frequency physical resources in frequency physical resource queue 2, and allocating the band of continuous frequency physical resources in the first time slot to the current user;

step S807: deleting this band of frequency physical resources from frequency physical resource queue 2, deleting the frequency physical resources, to be occupied by the current user after the frequency hopping, from frequency physical resource queue 2 and saving them in frequency physical resource queue 1, then executing step S808;

step S808: determining whether a scheduling queue is empty, if yes, executing step S813; otherwise, executing step S812;

step S809: determining whether frequency physical resource queue 2 is empty, if yes, turning to step S813; otherwise, turning to step S810;

step S810: searching a band of continuous frequency physical resources in frequency physical resource queue 2, and allocating the two time slots of this band of frequency physical resources to the current user;

step S811: deleting the band of frequency physical resources allocated in step S810 from frequency physical resource queue 2, then turning to step S808;

step S812: returning to step S801 to perform the scheduling for a next user;

step S813: as there is no available frequency physical resources, finishing this scheduling period.

According to embodiment 3 of the disclosure, for a base station, a cell is configured to be inter-subframe frequency hopping transmission, therefore in the disclosure, the two time slots of the frequency hopping transmission are a new transmission subframe or retransmission subframe employing inter-subframe frequency hopping. The method for scheduling frequency physical resources in this embodiment, as performing the inter-subframe frequency hopping transmission, will be described below.

The method for scheduling frequency physical resources based on frequency hopping in this embodiment comprises the following steps.

Step S901: frequency physical resources are reserved for both an activated semi-persistent scheduling new transmission user with a transmission period reached and a retransmission user, for simplicity, the occupancy and idleness of the frequency physical resources are presented by a frequency resource list in this embodiment; therefore this step is to identify the frequency physical resource occupancy situation, in the list which presents the frequency physical resource occupancy situation, of the activated semi-persistent scheduling new transmission user with the transmission period reached and the retransmission user.

For the activated semi-persistent scheduling new transmission user with the transmission period reached, the way of reserving frequency physical resources for the user is as follows: reserving the frequency physical resources which are allocated for the user as activated; for the retransmission user, if the retransmission user is a frequency-selective scheduling user, the way of reserving frequency physical resources for the user is as follows: the reserved frequency physical resources are identical to those occupied by the new transmission subframe of the retransmission user.

For the retransmission user, if the retransmission user is a non-frequency-selective scheduling user, the way of reserving frequency physical resources for the user is as follows: reserving frequency physical resources for the user according to the frequency physical resources occupied by the retransmission user as performing the frequency hopping transmission. The frequency-hopping-transmission-based non-frequency-selective scheduling new transmission user actually occupies identical frequency physical resources in the two periods of the subframe. As shown in FIG. 5, for frequency-hopping-transmission-based non-frequency-selective scheduling user 1, the new transmission subframe occupies the frequency physical resource blocks m~m+3 in the first time slot S0'; as occurring retransmission, the frequency physical resource blocks n~n+3 in the second time slot S1' are occupied according to the fixed frequency hopping offset. However for one subframe, identical frequency physical resources are occupied in the two periods S0 and S1 of the subframe. This embodiment adopting the following ways for identification in the frequency physical resource list: the frequency physical resources identified in the first time slot S0' are frequency physical resources actually occupied by the current user, while the frequency physical resources identified in the second time slot S1' are frequency physical resources to be occupied by the current user for the next time of retransmission, as shown in FIG. 9.

Figure 9:
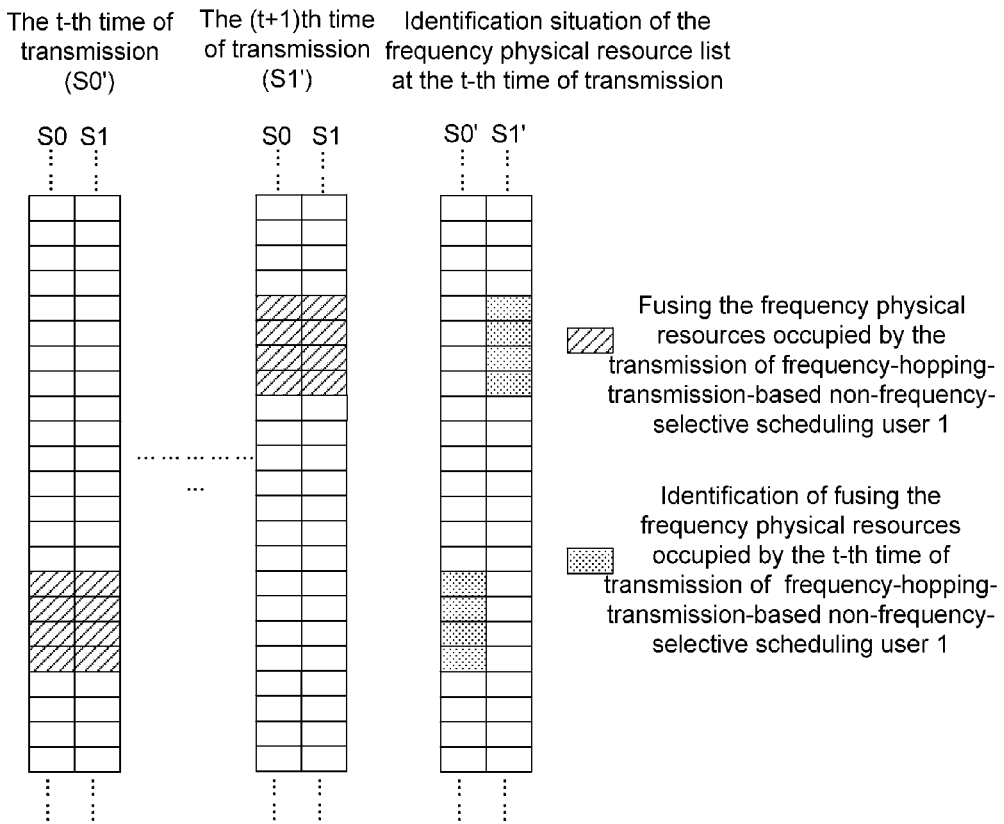
FIG. 9 shows a schematic diagram of a frequency resource list based on inter-subframe frequency hopping transmission according to embodiment 3 of the disclosure.

Step S902: according to the occupancy situation of the frequency physical resources, the frequency physical resources are put into two queues respectively: frequency physical resource queue 1 and frequency physical resource queue 2:

1) frequency physical resource queue 1 contains such frequency physical resources: the first time slot of the frequency physical resources has not been allocated for users, while the second time slot of the frequency physical resources has been allocated for users, as shown in FIG. 9;

2) frequency physical resource queue 2 contains such frequency physical resources: the two time slots of the frequency physical resources have not been allocated for users, as shown in FIG. 9.

Step S903: the scheduling queue is constructed according to the scheduling priorities of the users required for scheduling, and the scheduling types of the users in the scheduling queue are determined as follows:

1) when uplink channel quality information of a user is obtained by a base station through an uplink reference signal, then the user is identified for employing frequency-selective scheduling;

2) when uplink channel quality information of a user is not obtained by a base station, then the user is identified for employing non-frequency-selective scheduling based on frequency hopping transmission;

3) when the user is a semi-persistent scheduling user waiting for an activation (for example, a VoIP user), then the user is identified for employing non-frequency-selective scheduling based on frequency hopping transmission.

The scheduling priorities of the users can be calculated by various existing scheduling algorithms, such as Round Robin, Largest Throughput and Proportional Fairness, or can be configured as needed.

Step S904: the users are took out one by one from the scheduling queue, and scheduled according to the scheduling types of the users, specifically comprising the following steps:

step S101: determining whether a current user is a non-frequency-selective scheduling user, if yes, turning to step S102; otherwise, turning to step S109;

step S102: determining whether current frequency physical resource queue 1 is empty, if yes, turning to step S103; otherwise, turning to step S105;

step S103: searching a band of continuous frequency physical resources in frequency physical resource queue 1, and allocating the band of continuous frequency physical resources, with the first time slot is idle, to the current non-frequency-selective scheduling user;

step S104: deleting this band of frequency physical resources allocated in step S103 from frequency physical resource queue 1, and turning to step S108;

step S105: determining whether frequency physical resource queue 2 is empty, if yes, turning to step S113; otherwise, turning to step S106;

step S106: searching a band of continuous frequency physical resources in frequency physical resource queue 2, and allocating the band of continuous frequency physical resources in the first time slot to the current user;

step S107: deleting this band of frequency physical resources from frequency physical resource queue 2, deleting the frequency physical resources, to be occupied by the current user after frequency hopping, from frequency physical resource queue 2, and saving them in frequency physical resource queue 1, then executing step S108;

step S108: determining whether the scheduling queue is empty, if yes, executing step S113; otherwise, executing step S112;

step S109: determining whether frequency physical resource queue 2 is empty, if yes, turning to step S113; otherwise, turning to step S110;

step S110: searching a band of continuous frequency physical resources in frequency physical resource queue 2, and allocating the two time slots of this band of frequency physical resources to the current user;

step S111: deleting the band of frequency physical resources allocated in step S110 from frequency physical resource queue 2, then turning to step S108;

step S112: returning to step S101 to perform scheduling for a next user;

step S113: as there is no available frequency physical resource, finishing this scheduling period.

It can be seen that: the methods for scheduling frequency physical resources in the disclosure, for intra-subframe frequency hopping transmission and inter-subframe frequency hopping transmission, are identical, only the two time slots of frequency hopping transmission are defined different according to the employed frequency hopping transmission ways: one subframe is transmitted in the two time slots of the intra-subframe frequency hopping, while two subframes are transmitted in the two time slots of the inter-subframe frequency hopping. The method for scheduling frequency physical resources described above, not only allocates specific frequency physical resources to users for occupying, but also limits the time slots occupied by the allocated frequency physical resources, therefore it completes the allocation of time-frequency resources actually, such that the users can utilize the allocated time-frequency resources to transmit data.

Figure 10:
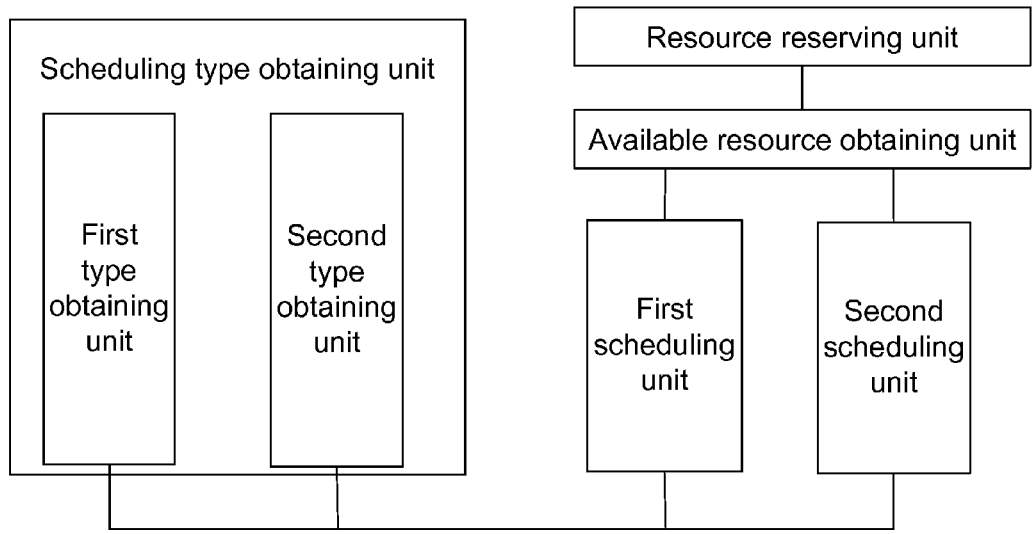
FIG. 10 shows a structure diagram of a system for scheduling frequency physical resources based on frequency hopping transmission according to embodiment 4 of the disclosure.

According to embodiment 4 of the disclosure, a system for scheduling frequency physical resources based on frequency hopping is provided, as shown in FIG. 10, the system comprises: a resource reserving unit configured to, in two time slots of frequency hopping transmission, reserve frequency physical resources for both an activated semi-persistent scheduling new transmission user with a transmission period reached and a retransmission user; a scheduling type obtaining unit configured to obtain a scheduling type of a user required for scheduling; an available resource obtaining unit configured to, according to an occupancy situation of the frequency physical resources, obtain the corresponding available frequency physical resources when employing a frequency-selective scheduling type and a non-frequency-selective scheduling type; a scheduling unit configured to, according to the scheduling type of the user required for scheduling, search for the corresponding available frequency physical resources, and allocate the frequency physical resources to the frequency-selective scheduling users and non-frequency-selective scheduling users simultaneously during one scheduling period. Preferably, the scheduling unit comprises: a first scheduling unit configured to, when the scheduling type of a user required for scheduling is non-frequency-selective scheduling, allocate the frequency physical resources for the user in the following ways: when the first frequency physical resources, with the first time slot not occupied while the second time slot occupied, are found, to allocate the first frequency physical resources with the first time slot not occupied to the non-frequency-selective scheduling user, or, when the first frequency physical resources are not found and a band of second frequency physical resources with two continuous time slots not occupied are found, to allocate this band of second frequency physical resources to the non-frequency-selective scheduling user; a second scheduling unit configured to, when the scheduling type of a user required for scheduling is frequency-selective scheduling, allocate the frequency physical resources to the user in the following way: when a band of second frequency physical resources with two continuous time slots not occupied is found, to allocate this band of second frequency physical resources to the frequency-selective scheduling user.

In this embodiment, the scheduling type obtaining unit comprises:

a first type obtaining unit configured to, when channel quality information of a user is obtained, identify the scheduling type of the user as frequency-selective scheduling;

a second type obtaining unit configured to, when the channel quality information of the user is not obtained, identify the scheduling type of a user as non-frequency-selective scheduling based on frequency hopping transmission, and identify the scheduling type of a semi-persistent scheduling user waiting for an activation as non-frequency-selective scheduling based on frequency hopping transmission.

Preferably, the system further comprises: a scheduling queue constructing unit configured to, when there are multiple users required for scheduling, construct a scheduling queue according to scheduling priorities of the users; the scheduling unit is configured to take out the users one by one from the scheduling queue, search for the corresponding available frequency physical resources according to the scheduling types of the users, then allocate the frequency physical resources to the users.

The system can be applied in a communication system employing intra-subframe frequency hopping, and the two time slots are one subframe employing the intra-subframe frequency hopping. The system can further be applied in a communication system employing inter-subframe frequency hopping, and the two time slots are a new transmission subframe or retransmission subframe employing inter-subframe frequency hopping.

Obviously, for those skilled in the prior art, the disclosure may have various modifications and variations within the sprit and protection scope of the disclosure. In this way, if these modifications and variations are made within the protection scope of the claims and equivalent technologies, the disclosure is intended to include these modifications and variations.

What is claimed is:

1. A method for scheduling frequency physical resources based on frequency hopping, comprising:
    in two time slots of frequency hopping transmission, reserving frequency physical resources for an activated semi-persistent scheduling new transmission user with a transmission period reached and a retransmission user;
    obtaining a scheduling type of a user required for scheduling, and according to an occupancy situation of the frequency physical resources, obtaining corresponding available frequency physical resources when employing a frequency-selective scheduling type and a non-frequency-selective scheduling type; and
    according to the scheduling type of the user required for scheduling, searching for corresponding available frequency physical resources, and allocating the frequency physical resources to a frequency-selective scheduling user and a non-frequency-selective scheduling user simultaneously during one scheduling period.

2. The method according to claim 1, wherein when the scheduling type of the user required for scheduling is non-frequency-selective scheduling, allocating the frequency physical resources to the user comprises:
    when first frequency physical resources, with a first time slot not occupied while a second time slot occupied, are found, allocating the first frequency physical resources with the first time slot not occupied to the non-frequency-selective scheduling user; or
    when first frequency physical resources are not found and a band of second frequency physical resources with two continuous time slots not occupied is found, allocating this band of the second frequency physical resources to the non-frequency-selective scheduling user.

3. The method according to claim 2, wherein,
    the two time slots are one subframe employing intra-subframe frequency hopping; or
    the two time slots are a new transmission subframe or retransmission subframe employing inter-subframe frequency hopping.

4. The method according to claim 1, wherein when the scheduling type of the user required for scheduling is frequency-selective scheduling, allocating the frequency physical resources to the user comprises:
    when a band of second frequency physical resources with two continuous time slots not occupied is found, allocating this band of the second frequency physical resources to the frequency-selective scheduling user.

5. The method according to claim 4, wherein,
    the two time slots are one subframe employing intra-subframe frequency hopping; or
    the two time slots are a new transmission subframe or retransmission subframe employing inter-subframe frequency hopping.

6. The method according to claim 1, wherein obtaining the scheduling type of the user required for scheduling comprises:
    when uplink channel quality information of the user is obtained, the scheduling type of the user is the frequency-selective scheduling type;
    when uplink channel quality information of the user is not obtained, the scheduling type of the user is the non-frequency-selective scheduling type based on frequency hopping transmission;
    when the user is a semi-persistent scheduling user waiting for an activation, the scheduling type of the user is the non-frequency-selective scheduling type based on frequency hopping transmission.

7. The method according to claim 6, wherein,
    the two time slots are one subframe employing intra-subframe frequency hopping; or
    the two time slots are a new transmission subframe or retransmission subframe employing inter-subframe frequency hopping.

8. The method according to claim 1, further comprising:
    when there are multiple users required for scheduling, constructing a scheduling queue according to scheduling priorities of the users;
    taking out the users one by one from the scheduling queue, searching for corresponding available frequency physical resources according to the scheduling types of the users, and allocating the frequency physical resources to the users.

9. The method according to claim 8, wherein,
    the two time slots are one subframe employing intra-subframe frequency hopping; or
    the two time slots are a new transmission subframe or retransmission subframe employing inter-subframe frequency hopping.

10. The method according to claim 1, wherein,
    the two time slots are one subframe employing intra-subframe frequency hopping; or
    the two time slots are a new transmission subframe or retransmission subframe employing inter-subframe frequency hopping.

11. A system for scheduling frequency physical resources based on frequency hopping, comprising: a resource reserving unit, a scheduling type obtaining unit, an available resource obtaining unit and a scheduling unit; wherein,
    the resource reserving unit is configured to, in two time slots of frequency hopping transmission, reserve frequency physical resources for an activated semi-persistent scheduling new transmission user with a transmission period reached and a retransmission user;
    the scheduling type obtaining unit is configured to obtain a scheduling type of a user required for scheduling;
    the available resource obtaining unit is configured to, according to an occupancy situation of the frequency physical resources, obtain corresponding available frequency physical resources when employing a frequency-selective scheduling type and a non-frequency-selective scheduling type; and
    the scheduling unit is configured to, according to the scheduling type of the user required for scheduling, search for corresponding available frequency physical resources, and allocate the frequency physical resources to a frequency-selective scheduling user and a non-frequency-selective scheduling user simultaneously during one scheduling period.

12. The system according to claim 11, wherein the scheduling unit further comprises:
    a first scheduling unit configured to, when the scheduling type of the user required for scheduling is non-frequency-selective scheduling, allocate the frequency physical resources to the user in the following ways: when first frequency physical resources, with a first time slot not occupied while a second time slot occupied, are found, the first scheduling unit is configured to allocate the first frequency physical resources with the first time slot not occupied to the non-frequency-selective scheduling user; or, when first frequency physical resources are not found and a band of second frequency physical resources with two continuous time slots not occupied is found, the first scheduling unit is configured to allocate this band of second frequency physical resources to the non-frequency-selective scheduling user.

13. The system according to claim 12, wherein the system is applied in a communication system employing intra-subframe frequency hopping, and the two time slots are one subframe employing the intra-subframe frequency hopping; or the system is applied in a communication system employing inter-subframe frequency hopping, and the two time slots are a new transmission subframe or retransmission subframe employing the inter-subframe frequency hopping.

14. The system according to claim 11, wherein the scheduling unit further comprises:

a second scheduling unit configured to, when the scheduling type of the user required for scheduling is frequency-selective scheduling, allocate the frequency physical resources to the user in the following way: when a band of second frequency physical resources with two continuous time slots not occupied is found, the second scheduling unit is configured to allocate this band of the second frequency physical resources to the frequency-selective scheduling user.

15. The system according to claim 14, wherein the system is applied in a communication system employing intra-subframe frequency hopping, and the two time slots are one subframe employing the intra-subframe frequency hopping; or the system is applied in a communication system employing inter-subframe frequency hopping, and the two time slots are a new transmission subframe or retransmission subframe employing the inter-subframe frequency hopping.

16. The system according to claim 11, wherein the scheduling type obtaining unit comprises a first type obtaining unit and a second type obtaining unit; wherein, the first type obtaining unit is configured to, when uplink channel quality information of the user is obtained, identify the scheduling type of the user as the frequency-selective scheduling type;

the second type obtaining unit is configured to, when channel quality information of the user is not obtained, identify the scheduling type of the user as the non-frequency-selective scheduling type based on frequency hopping transmission, and identify the scheduling type of a semi-persistent scheduling user waiting for an activation as the non-frequency-selective scheduling type based on the frequency hopping transmission.

17. The system according to claim 16, wherein the system is applied in a communication system employing intra-subframe frequency hopping, and the two time slots are one subframe employing the intra-subframe frequency hopping; or the system is applied in a communication system employing inter-subframe frequency hopping, and the two time slots are a new transmission subframe or retransmission subframe employing the inter-subframe frequency hopping.

18. The system according to claim 11, further comprising:
a scheduling queue constructing unit configured to, when there are multiple users required for scheduling, construct a scheduling queue according to scheduling priorities of the users; and the scheduling unit is configured to take out users one by one from the scheduling queue, search for corresponding available frequency physical resources according to the scheduling types of the users, and allocate the frequency physical resources to the users.

19. The system according to claim 18, wherein the system is applied in a communication system employing intra-subframe frequency hopping, and the two time slots are one subframe employing the intra-subframe frequency hopping; or the system is applied in a communication system employing inter-subframe frequency hopping, and the two time slots are a new transmission subframe or retransmission subframe employing the inter-subframe frequency hopping.

20. The system according to claim 11, wherein the system is applied in a communication system employing intra-subframe frequency hopping, and the two time slots are one subframe employing the intra-subframe frequency hopping; or the system is applied in a communication system employing inter-subframe frequency hopping, and the two time slots are a new transmission subframe or retransmission subframe employing the inter-subframe frequency hopping.

* * * * *